(12) United States Patent
Haberman et al.

(10) Patent No.: US 11,763,326 B2
(45) Date of Patent: *Sep. 19, 2023

(54) SYSTEMS AND METHODS FOR ANONYMOUS BEHAVIORAL-BASED RECORDS IDENTIFICATION

(71) Applicant: FreeWheel Media, Inc., Philadelphia, PA (US)

(72) Inventors: Seth Haberman, New York, NY (US); Claudio Marcus, Andover, NH (US)

(73) Assignee: FreeWheel Media, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,254

(22) Filed: Oct. 27, 2021

(65) Prior Publication Data

US 2022/0156761 A1 May 19, 2022

Related U.S. Application Data

(63) Continuation of application No. 16/058,822, filed on Aug. 8, 2018, now Pat. No. 11,195,188, which is a
(Continued)

(51) Int. Cl.
*G06F 17/00* (2019.01)
*G06Q 30/0201* (2023.01)

(52) U.S. Cl.
CPC .............................. *G06Q 30/0201* (2013.01)

(58) Field of Classification Search
CPC ................................................. G06Q 30/0201
See application file for complete search history.

(56) References Cited

U.S. PATENT DOCUMENTS

| 7,099,946 B2 | 8/2006 | Lennon et al. |
| 7,930,252 B2 | 4/2011 | Bender et al. |

(Continued)

FOREIGN PATENT DOCUMENTS

| JP | 2004-512583 | 4/2004 |
| WO | 2013/151905 A2 | 10/2013 |

OTHER PUBLICATIONS

International Search Report and Written Opinion dated Jun. 24, 2015, from corresponding International Application No. PCT/US15/19727, International Filing Date Mar. 10, 2015.
(Continued)

*Primary Examiner* — Greta L Robinson
(74) *Attorney, Agent, or Firm* — BakerHostetler

(57) ABSTRACT

Methods, systems, and computer-readable media for identifying users, records, and/or devices using anonymous source data records associated with consumer activity are described. In general, the consumer activity may relate to consumer interactions with devices and/or content or data through devices. The source data records may be structured, such as associating the source data records with a sequential timeline. Behavioral markers may be generated by the matching system and associated with the source data records. Each behavioral marker may be analyzed across all of the source data records to determine the effectiveness of the behavioral marker to identify unique source data records. One or more of the behavioral markers may be used to generate a behavioral fingerprint. A behavioral fingerprint may be used to identify unique records, devices, and/or users, including identification based on different sets of source data records.

20 Claims, 4 Drawing Sheets

Related U.S. Application Data continuation of application No. 14/643,921, filed on Mar. 10, 2015, now Pat. No. 10,074,096.

(60) Provisional application No. 61/950,393, filed on Mar. 10, 2014.

(56) References Cited

U.S. PATENT DOCUMENTS

| | | | |
|---|---|---|---|
| 8,027,864 | B2 | 9/2011 | Gilbert |
| 8,949,890 | B2 | 2/2015 | Evans et al. |
| 9,015,163 | B1 | 4/2015 | Skolicki et al. |
| 10,074,096 | B2 | 9/2018 | Haberman et al. |
| 10,269,029 | B1* | 4/2019 | Evans ............... G06Q 30/0201 |
| 11,195,188 | B2* | 12/2021 | Haberman ......... G06Q 30/0201 |
| 2002/0010864 | A1 | 1/2002 | Safa |
| 2007/0106606 | A1 | 5/2007 | Pankratz et al. |
| 2007/0206606 | A1 | 9/2007 | Coleman et al. |
| 2007/0214037 | A1 | 9/2007 | Shubert et al. |
| 2007/0279187 | A1 | 12/2007 | Hekmatpour et al. |
| 2008/0092168 | A1 | 4/2008 | Logan et al. |
| 2010/0332319 | A1 | 12/2010 | Etchegoyen |
| 2011/0113007 | A1 | 5/2011 | Buckley |
| 2011/0137975 | A1 | 6/2011 | Das et al. |
| 2011/0221771 | A1 | 9/2011 | Cramer et al. |
| 2012/0023547 | A1 | 1/2012 | Maxson et al. |
| 2012/0323694 | A1 | 12/2012 | Lita et al. |
| 2013/0055300 | A1 | 2/2013 | Hanina |
| 2013/0102283 | A1 | 4/2013 | Lau et al. |
| 2013/0124315 | A1 | 5/2013 | Doughty et al. |
| 2013/0133052 | A1 | 5/2013 | Davis et al. |
| 2013/0197968 | A1 | 8/2013 | Davis et al. |
| 2013/0346148 | A1 | 12/2013 | Roth et al. |
| 2014/0244351 | A1 | 8/2014 | Symons |
| 2014/0244641 | A1 | 8/2014 | Patterson |
| 2016/0142379 | A1 | 5/2016 | Tawakol et al. |

OTHER PUBLICATIONS

US Patent Application filed Oct. 27, 2021, entitled "Systems And Methods For Anonymous Behavioral-Based Records Identification", U.S. Appl. No. 17/512,130.

* cited by examiner

SYSTEMS AND METHODS FOR ANONYMOUS BEHAVIORAL-BASED RECORDS IDENTIFICATION

CROSS REFERENCE TO RELATED APPLICATIONS

This application is a continuation of U.S. patent application Ser. No. 16/058,822 filed on Aug. 8, 2018, which is a continuation of U.S. patent application Ser. No. 14/643,921 filed on Mar. 10, 2015, now U.S. Pat. No. 10,074,096 issued on Sep. 11, 2018, which claims the benefit of U.S. Provisional Application No. 61/950,393 filed on Mar. 10, 2014, the contents of which are incorporated by reference in their entirety as if fully set forth herein.

FIELD OF INVENTION

The described technology generally relates to identification of consumer data and, more specifically, to identifying anonymous consumer data based on behavioral markers associated therewith.

BACKGROUND

As the collection and use of digital information about consumers has grown, so have concerns about consumer privacy and data security. Service providers collect information associated with consumers and consumer interactions with their services for marketing purposes and/or to be sold to other entities for consumer marketing purposes. However, as service providers, such as Internet service operators (for instance, Facebook®) and media content providers (such as a cable network operator) have increased the amount and sophistication of their data collection efforts, consumers have become more aware of how their information is being used. In addition, they have become increasingly concerned that their information may be used and collected in ways that they are not aware of or that they do not expect. In general, companies have relied on the integration of data collected based on primary keys relating to consumers such as name, address, phone and email address. This personally identifiable information (PII) may be used to match data records from disparate sources. However, consumers and privacy advocates have voiced concern about such practices and government agencies have instituted regulations limiting the collection and/or use of PII.

Accordingly, what is needed is a system that allows for the anonymous collection of information relating to consumer activity that is useful for marketing and other related purposed, while also protecting the identity and privacy of consumers.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a system for behavioral-based user records identification using anonymous user information may include a processor and a non-transitory, computer-readable storage medium in operable communication with the processor. The computer-readable storage medium may contain one or more programming instructions that, when executed, cause the processor to receive a plurality of source data records comprising anonymous information associated with user interactions with a plurality of client logic devices, correlate the source data with a sequential timeline over a timeline duration, determine a plurality of behavioral markers for each of the plurality of source data records, generate at least one behavioral fingerprint based on an aggregation of the plurality of behavioral markers, and associate the at least one behavioral fingerprint with at least one of the plurality of client logic devices.

In an embodiment, a computer-implemented method for behavioral-based user records identification using anonymous user information may include, by a processor receiving a plurality of source data records comprising anonymous information associated with user interactions with a plurality of client logic devices, correlating the source data with a sequential timeline over a timeline duration, determining a plurality of behavioral markers for each of the plurality of source data records, generating at least one behavioral fingerprint based on an aggregation of the plurality of behavioral markers, and associating the at least one behavioral fingerprint with at least one of the plurality of client logic devices.

In an embodiment, a computer-readable storage medium having computer-readable program code configured for behavioral-based user records identification using anonymous user information may include computer-readable program code configured to receive a plurality of source data records comprising anonymous information associated with user interactions with a plurality of client logic devices, computer-readable program code configured to correlate the source data with a sequential timeline over a timeline duration, computer-readable program code configured to determine a plurality of behavioral markers for each of the plurality of source data records, computer-readable program code configured to generate at least one behavioral fingerprint based on an aggregation of the plurality of behavioral markers, and computer-readable program code configured to associate the at least one behavioral fingerprint with at least one of the plurality of client logic devices.

BRIEF DESCRIPTION OF THE DRAWINGS

The above and other objects of the present invention will become more readily apparent from the following detailed description taken in connection with the accompanying drawings.

DETAILED DESCRIPTION

Figure 1:
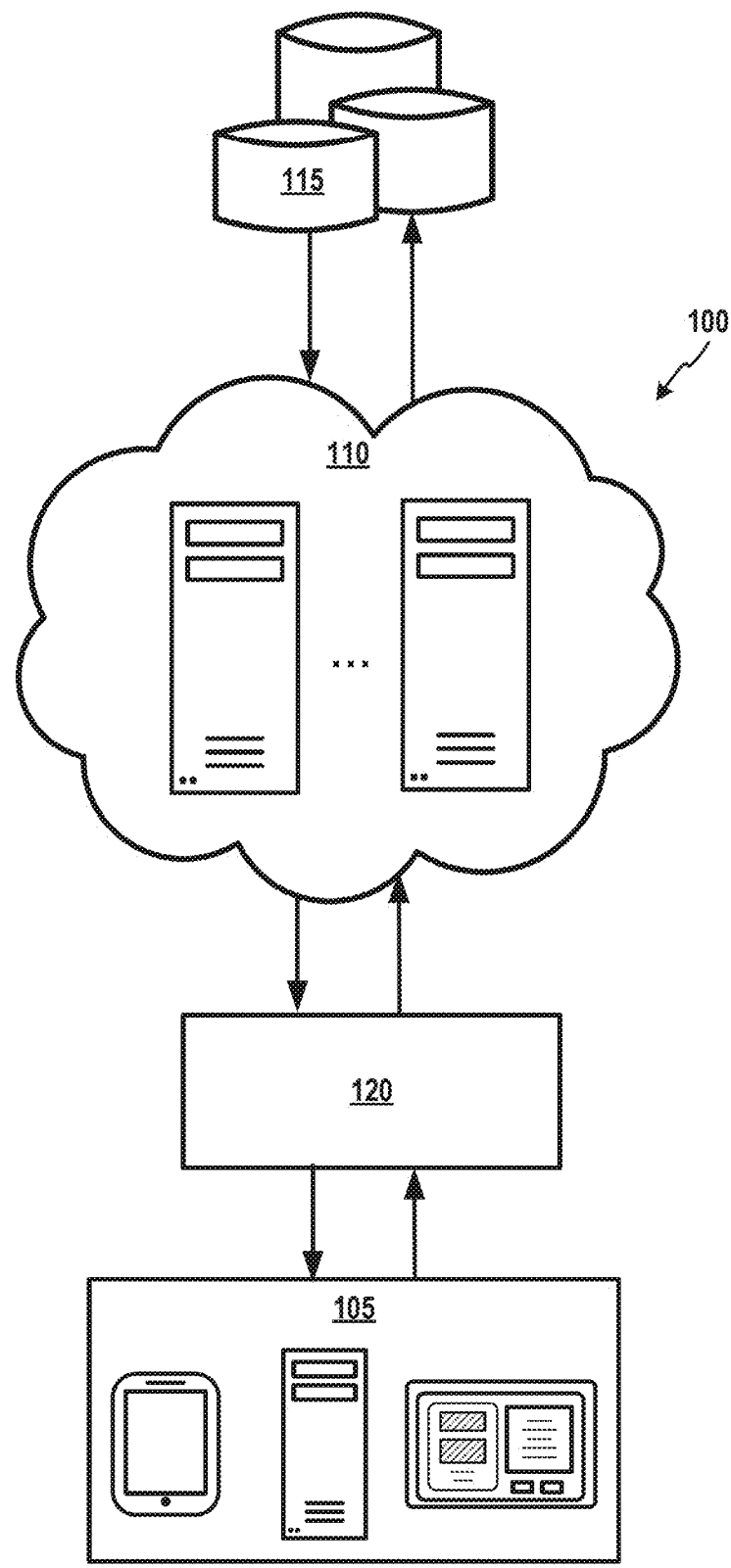
FIG. 1 depicts an illustrative record matching system according to some embodiments.

The described technology generally relates to systems, methods, and computer readable media for matching and/or identifying source data records of consumer activity. The source data records may be associated with user (or "consumer") interactions with content presentation devices, computing devices, consumer electronic devices, retailers, marketers, or other entities and/or devices capable of generating source data records. In some embodiments, interactions may include, without limitation, television viewing, downloading, Internet activity, social network activity, electronic program guide activity, personal video recorder activity, purchasing activity, survey activity, or the like. In some embodiments, at least a portion of the source data records may include anonymous (or "anonymized" or "de-identified") data that does not include or substantially does not include any personal identifiable information (PII) and/or cannot otherwise reasonably be used to identify an individual, computing device, and/or records relating thereto. In some embodiments, a behavioral-based record identification (or "matching") system (the "system" or the "matching system") may be configured to process, fingerprint, and/or match source data records. The matching system may be configured to receive source data records, including anonymous source data records, and to associate them with a sequential timeline. Behavioral markers may be generated by the matching system and associated with the source data records. Each behavioral marker may be analyzed across all of the source data records to determine the effectiveness of the behavioral marker to identify unique source data records. One or more of the behavioral markers may be used to generate a behavioral fingerprint. In some embodiments, the behavioral fingerprints generated on a first set of source data records may be used to identify users (or "consumers"), source data records, devices, or the like associated with a second set of source data records. In some embodiments, the matching system does not use or substantially does not use any source data records or any information containing PII or other consumer privacy identifiers.

The source data records may include any type of record capable of being generated based on user interaction with a device and/or content through a medium. Illustrative mediums may include audio and visual mediums such as television (or "TV"), radio, and broadcast, cable, satellite, and/or network (e.g., Internet) forms thereof. Examples of content may include, but are not limited to, video, audio, movies, video games, television and radio programs, commercials, websites, images, photographs, text, electronic or digital documents, information feeds, streaming media, social media, social networks, and/or combinations thereof. The source data records may include information relating to a device, content, and/or user interactions therewith. For example, a source data record for a set-top-box may include information relating to location, service provider, program guides, channel selection, content, activity relating to any of the foregoing (for example, selection of a program from a program guide), or the like.

A device generally refers to any device now known to those having ordinary skill in the art or developed in the future that is capable of presenting or providing access to content and/or data to a user. Non-limiting examples of devices may include televisions, smart televisions, laptops, personal digital assistants (PDAs), tablet computing devices, smartphones, personal computers (PCs), radios, audio devices, electronic reading devices ("e-readers"), set-top-boxes, satellite receivers, video-on-demand (VOD) receivers, content receivers (e.g., Apple TV® manufactured by Apple Inc. of Cupertino, Calif., United States; Roku® manufactured by Roku, Inc. of Saratoga, Calif., United States), digital video recorders (DVRs), personal video recorders (PVRs), hard drives, flash drives, storage servers, digital video disc (DVD) devices, Blu-ray™ devices, in-car entertainment systems, or the like.

Service providers and marketing companies ("marketers") have long relied on the collection of PII as part of their operating procedures, including for marketing purposes. The PII may be used to match data records from disparate sources. However, this activity has been curtailed due to consumer privacy concerns and government regulation. Nonetheless, the growing use of Internet-connected devices continually generates an enormous amount of consumer data that can and is being used by service providers and marketers. The digital footprints generated by use of computing devices by consumers has also generated new types of identifiers such as Internet Protocol (IP) addresses, cookies, device fingerprints, user profiles, social login handles, or the like, which can and are being used by service providers and marketers to fill in previously unknown gaps in consumer behavior.

In general, digital footprints are not a digital identity; however, the content and metadata collected potentially impacts upon consumer privacy, trust, security, and the reputation of companies that collect and make use of such information. For example, digital footprints may be used to infer personal information, such as demographic traits, gender, viewpoint affiliations, personality, or intelligence without an individuals' knowledge.

The Federal Trade Commission (FTC) has played an active and prominent role in offline and online privacy issues. Traditionally, the FTC has taken the position that self-regulation by industry is the most effective way to manage the privacy of personal data. As such, marketers and other industry participants have developed, and generally advocate, that businesses follow best practices when it comes to the sharing of personal data as well as records of online and/or offline consumer behavior. One illustrative best practice requires that an organization not share PII with an outside party without notifying the individual to whom the information relates and, in some circumstances, seeking consent. Overall, the focus has been on PII (such as name, address, phone, email address, etc.). Nevertheless, there is a growing need to better ensure that digital records of individuals' online and offline behaviors are also safely managed and only shared in an anonymized basis.

In some particular industries, such as the medical and financial fields, laws and regulations have been developed regulate the sharing of consumer information, particularly information including PII. Nonetheless, companies in non-regulated fields also realize that they must proactively enact best practices that enable the use of collected information for marketing and other purposes, while also looking to protect consumer privacy, or risk a consumer reaction or regulation that imposes rules that govern use of consumer data. In addition, companies and marketers are increasingly challenged with managing the volume of raw data and, in particular, with determining and locating the share of that volume that actually has value for the company or for marketers. With increasing volumes of complex, unstructured data, companies are increasingly relying on digital linking to piece together trails of consumer behaviors related to, for example, online and offline purchases, media impressions and interactions, including mobile phone usage, TV viewing data, and more.

From a data integration perspective, identifiers such as IP addresses, cookies, device fingerprints and social login handles present significant challenges because they are anonymous and often very transient. For example, IP addresses may be generated when any device interacts on the Internet, such as a smartphone, Internet-enabled TV, game console, in-car entertainment system, or home appliance. Valuable information may be derived by matching data based on IP addresses, but since Internet Services Providers (ISPs) often assign dynamic IP addresses, different devices may appear to have the same address over time. In addition, multiple devices may be assigned the same IP address when they are on the same network. This can be useful in terms of looking to gain insights across devices within a network, but presents significant challenges when IP addresses are assigned to corporate networks or IP blocks, such as multi-household dwelling units.

At present, cookies are a typical data exchange method used in conjunction with digital marketing activities. The Interactive Advertising Bureau (IAB) defines a cookie as a small text file sent by a website's server to be stored on the user's web-enabled device that is returned unchanged by the user's device on subsequent interactions to the server. The cookie may enable the website domain to associate data with a specific device which distinguishes it from different devices. From a data integration perspective, cookies present challenges in that they can differ across browsers even on the same device. Cookies can also be readily deleted by users. In addition, the breadth and use of increasingly persistent cookies is increasingly viewed as intrusive and not consumer-friendly.

Because of the challenges associated with the use of cookies, some companies have seen an opportunity to create an alternative method for tracking devices. Such alternative solutions rely on extracting information about a device's configuration, in addition to the IP address, to create a unique device signature. Such an approach may identify unique devices 99% of the time. Nonetheless, marketers are reluctant to use such device identification techniques due to potential consumer privacy concerns since, unlike cookies, a user simply cannot delete a device fingerprint to avoid being tracked.

Companies are interested in extracting greater value from their collected data by enhancing their data with relevant third party data. However, conventional technology requires that companies trust third parties with personally identifiable information. Most companies are reluctant to share their consumer data records for the purpose of appending relevant additional information. Certain companies rely on the use of relatively weaker identifiers (for instance, IP addresses or cookies) to integrate and append relevant consumer data. However, from a business perspective, such approaches are typically less reliable and are still associated with consumer privacy concerns.

Companies and marketers often obtain data from third parties and/or sell their own data to third parties. Companies that acquire the right to use and/or resell consumer data often face contractual limitations that limit their ability to share or sell consumer and/or device-level data records with other companies. For example, a company that has licensed the use of television set-top-box (STB) data from various cable, satellite, or other TV distribution companies, may be interested in matching its data with other companies that have licensed similar data as such activity may provide a broader and/or a deeper perspective of the related data sets. However, companies interested in such matching face considerable restrictions in their ability to exchange any PII, IP addresses, device IDs, device related fingerprints, or the like as well as any raw data records relating thereto. Consequently, the ability for these companies to better understand or enhance their consumer data related offerings is currently restricted.

Although the growth in availability of data provides opportunities for companies to better understand consumer behavior, any form of data linking must balance the reliability of the matching with consumer privacy concerns. In addition, for companies that engage in the business of developing and selling consumer data-driven products and services, the ability to extract value from the collection and use of data is limited by their source-data contractual agreements and present data matching capabilities.

Accordingly, some embodiments provide systems and methods that enable independent parties to separately generate a reliable matching identification using behavioral fingerprint markers and to do so without using any or substantially without and PII, IP addresses, device IDs, device related fingerprints, or the like. In some embodiments, the behavioral fingerprint marker may correspond with digital footprints of anonymized consumer behavior. In some embodiments, the source data (or source data records) may include complex structured or unstructured source data where there are needs for reliable matching of unique records, including data that involves consumer privacy sensitivities and/or companies that engage in the business of developing and selling consumer data-driven products and services.

In some embodiments, the matching system may analyze digital footprints of anonymized consumer behavior to determine suitable aggregated markers that serve to distinguish records from one another. The methods and systems described according to some embodiments may seem similar to DNA profiling, which is a technique employed by forensic scientists to assist in the identification of individuals by their respective DNA profiles. However, unlike the use of DNA profiles that reflect a portion of a person's DNA makeup, the methods and systems described according to some embodiments involve the aggregation and/or classification of partial components of the underlying source data, such that the resulting markers are may not be part of the underlying source data. In some embodiments, the source data records may include complex structured and/or unstructured source data, including, but not limited to, exposures and/or interactions on the Internet, mobile phones, TV, game consoles, home appliances, or the like.

FIG. 1 depicts an illustrative matching according to some embodiments. As shown in FIG. 1, the matching system 100 may include one or more server logic devices 110, which may generally include a processor, a non-transitory memory or other storage device for housing programming instructions, data or information regarding one or more applications, and other hardware, including, for example, the central processing unit (CPU) 405, read only memory (ROM) 410, random access memory (RAM) 415, communication ports 440, controller 420, and/or memory device 425 depicted in FIG. 4 and described below in reference thereto.

In some embodiments, the programming instructions may include a behavioral-based record matching application (the "matching application" or the "application") configured to, among other things, generate behavioral fingerprints based on source data records and to use the behavioral fingerprints to match other source data records. The server logic devices 110 may be in operable communication with client logic devices 105, including, but not limited to, devices including, without limitation, server computing devices, personal computers (PCs), kiosk computing devices, mobile computing devices, laptop computers, smartphones, PDAs, global positioning system (GPS) devices, televisions (including, Internet-connected televisions or "smart" televisions), printing devices, tablet computing devices, in-car entertainment (ICE) systems, set-top-boxes, PVRs, DVRs, or any other logic and/or computing devices now known or developed in the future.

The matching application may be configured to receive data source records from the client logic devices. In some embodiments, the data source records may be received by the server logic devices 110 through a service provider 120, other entity, communication device (for instance, a network edge device), or a software platform operated thereby. In some embodiments, the data source records and/or a portion thereof may be anonymous. In some embodiments, the matching application may only receive anonymous data source records. In some embodiments, the data source records from the client logic devices 105 may include PII and may be de-identified by the service provider 120 and/or by the matching application. The data source records may be stored within one or more databases 115.

In some embodiments, the matching application may be configured to associate the source data records with a sequential timeline that represents a time duration. For instance, the time duration may be configured based on time, such as a 24-hour day or day-parts, such as morning, afternoon, evening, prime-time, workday, weekdays, weekend, hour-based segments (for example, 8-hour segments, 4-hour segments, or the like). In another instance, TV viewing data derived from a set-top-box, a smart TV, a gaming console, or the like may have a time duration based on a day of TV viewing. In some embodiments, the time duration may be based on one or more events, such as a time duration relating to a sporting event, concert, news event, media presentation, or the like.

In some embodiments, the matching application may be configured to generate, create, or otherwise develop behavioral markers associated with the source data records. In some embodiments, the behavioral markers may be generated based on an aggregation and/or classification of the source data records. In some embodiments, the behavioral markers may be generated based on the same portion of each source data record, such as the same time period within the time duration. For example, TV viewing data may be aggregated and classified such that for each individual source data record there is a behavioral marker that corresponds to the TV network with the most associated time spent viewing during each quarter hour of each day (or nothing if the set-top-box is inactive, indicating that the TV is inactive). For instance, certain data source records (for example, associated with a first device) may have Channel 1 at time period 1 as a behavioral marker and certain other data source records may have Channel 2 at time period 2. In another example, certain data source records may have a behavioral marker indicating "second screen" activity in which a user interacts with a second device, such as a mobile device, while watching a first device, such as a TV.

In some embodiments, a plurality of different behavioral markers may be generated and associated with the source data records. For example, for Internet-usage source data records, a first behavioral marker may be generated relating to video content consumption and a second behavioral marker may be generated relating to social network activity. In some embodiments, a data record timeline may be generated that includes a timeline with associated source data records that may be accessed, viewed, deleted, or otherwise modified by selecting a corresponding portion of the timeline.

The matching application may aggregate the behavioral markers over the time duration, or a portion thereof, to generate a behavioral fingerprint. In some embodiments, the behavioral fingerprint may be sufficiently unique to be associated with a client logic device 105, a user, or other entity or segment (such as a service provider, demographic segment, or the like). For instance, over the course of any full day of TV viewing behavior, the TV viewing behavioral fingerprint generated from the aggregated behavioral markers may be unique enough to be associated with individual client logic devices 105.

Statistical analysis of the behavioral markers may be performed by the matching application according to some embodiments. In some embodiments, the statistical analysis may be performed across at least a portion, including all of or substantially all, of the behavioral markers across all or substantially all of the source data records to determine, among other things, how effective each behavioral marker is at identifying unique records. In some embodiments, the statistical analysis may include identifying and/or assessing how sets of behavioral markers may be combined to identify unique records. For instance, different behavioral marks and/or combinations thereof may be more effective for certain types of interactions. For example, certain behavioral marks and/or combinations thereof may be more effective for TV viewing while others may be more effective for Internet activity. The behavioral markers and/or analysis information associated with the analysis thereof may be stored within the one or more databases 115.

Figure 2:
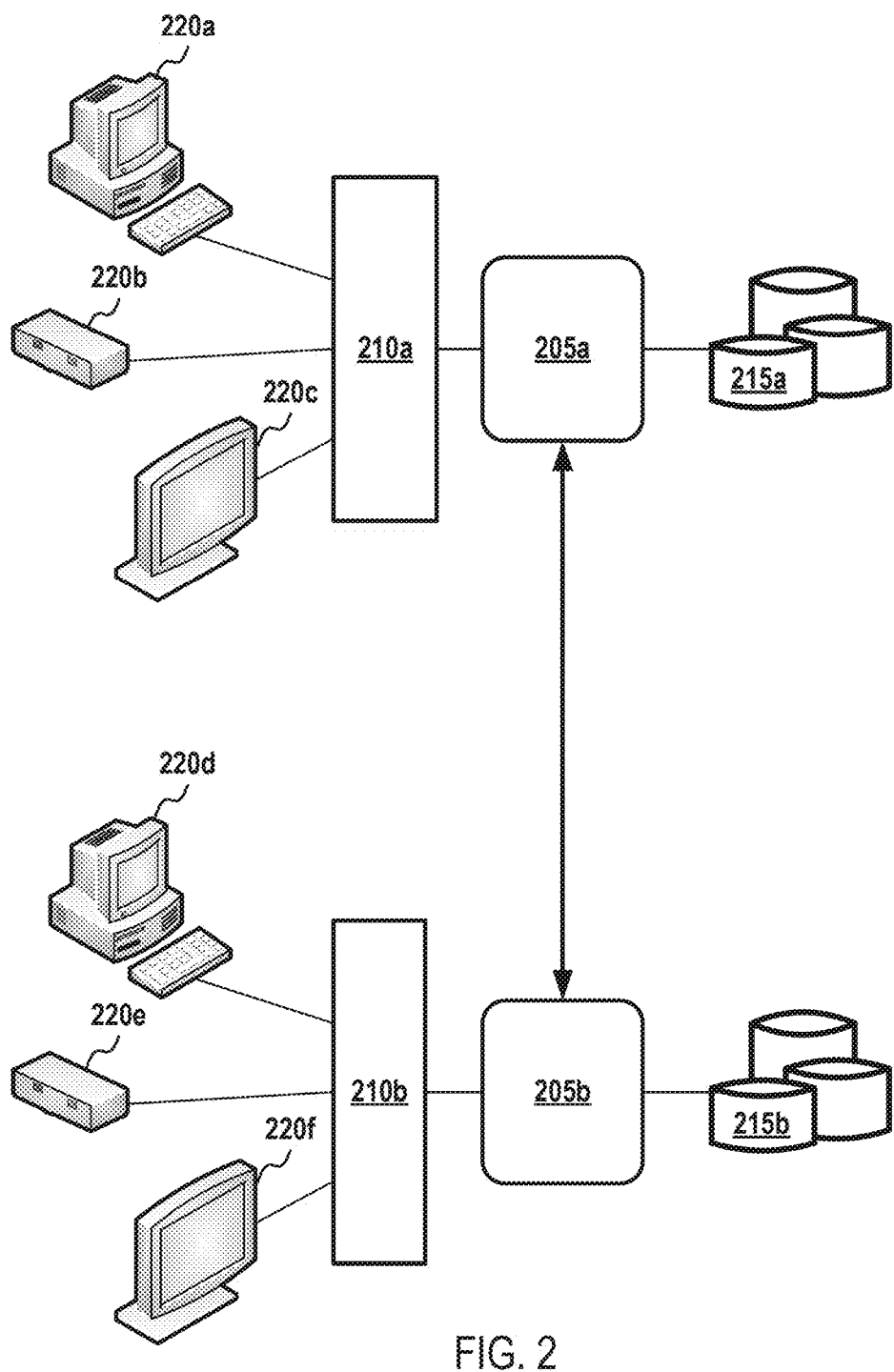
FIG. 2 depicts an illustrative record matching system according to some embodiments.

In some embodiments, the behavioral fingerprints generated based on a first set of source data records may be applied to a second set of records, such as an independent set of similar records. FIG. 2 depicts an illustrative record matching system configured to apply behavioral fingerprints to multiple sets of records according to some embodiments. As shown in FIG. 2, a first matching system 205a may be configured to receive source data records from a first set of devices 220a-c through a first data source 210a. The first matching system 205a may be configured to generate behavioral markers and at least one behavioral fingerprint according to some embodiments for TV viewing source data records associated with TV devices 220c. The behavioral markers and behavioral fingerprints may be stored in a matching database 215a.

The resulting behavioral markers and/or behavioral fingerprints from independently sourced data can be used to reliably match individual records, without using any PII or other consumer privacy sensitive identifiers. Accordingly, the behavioral markers and/or behavioral fingerprints generated by the first matching system 205a may be used to match similar data sets across companies, matching systems, or other entities while complying with restrictions regarding any sharing of source data. For example, a second matching system 205b may be configured to receive source data records from a second set of devices 220d-f through a second data source 210b. In some embodiments, the second matching system 205b may be configured to receive behavioral markers and/or behavioral fingerprints from the first matching system 205a (for instance, "external behavioral markers" or "external behavioral fingerprints") and may store them, for example, in matching database 215b. In some embodiments, the second matching system 205b may use the behavioral markers to generate one or more behavioral fingerprints according to its own processes, preferences, settings, parameters, or the like. In some embodiments, the second matching system 205b may use the behavioral fingerprints to match individual records, including its own records and/or records from other entities. For example, one company that collects TV viewing source data records derived from set-top-box data may match records with another company that collects TV viewing source data records derived from Internet-connected Smart TVs enabled with automated content recognition (ACR). According to some embodiments, matching the resulting behavioral fingerprints may allow the companies to know which records they have in common.

Once a specific type of behavioral fingerprint has been established, for example, by the first matching system 205a, the behavioral fingerprint may be used by companies to match source data records without having to explicitly share the underlying source data, or any PII or other consumer privacy sensitive unique identifiers. For instance, the second matching system 205b may send a request or otherwise communicate with the first matching system 205b requesting behavioral fingerprints generated and analyzed by the first matching system, such as behavioral fingerprints relating to certain activity, such as TV viewing using a mobile device. In response, the first matching system 205a may transmit the requested behavioral fingerprint to the second matching system 205b. In another embodiment, the first matching system 205a may provide the second matching system 205b with one or more behavioral markers for generating its own behavioral fingerprints. For example, the first matching system 205a may provide one or more behavioral markers indicated as being effective for a particular type of device interaction, such as Internet-based activity on a computing device.

In some embodiments, either entity could also then append aggregated or classified information related to any of the behavioral fingerprint matched records. For example, a company that collects TV viewing records derived from set-top-box data may have developed a sophisticated consumer segmentation scheme, which can then be appended to the matching records for the company that collects TV viewing records derived from Internet-connected, ACR-enabled Smart TVs. By matching the resulting behavioral fingerprints, the companies could know which records they have in common.

Figure 3:
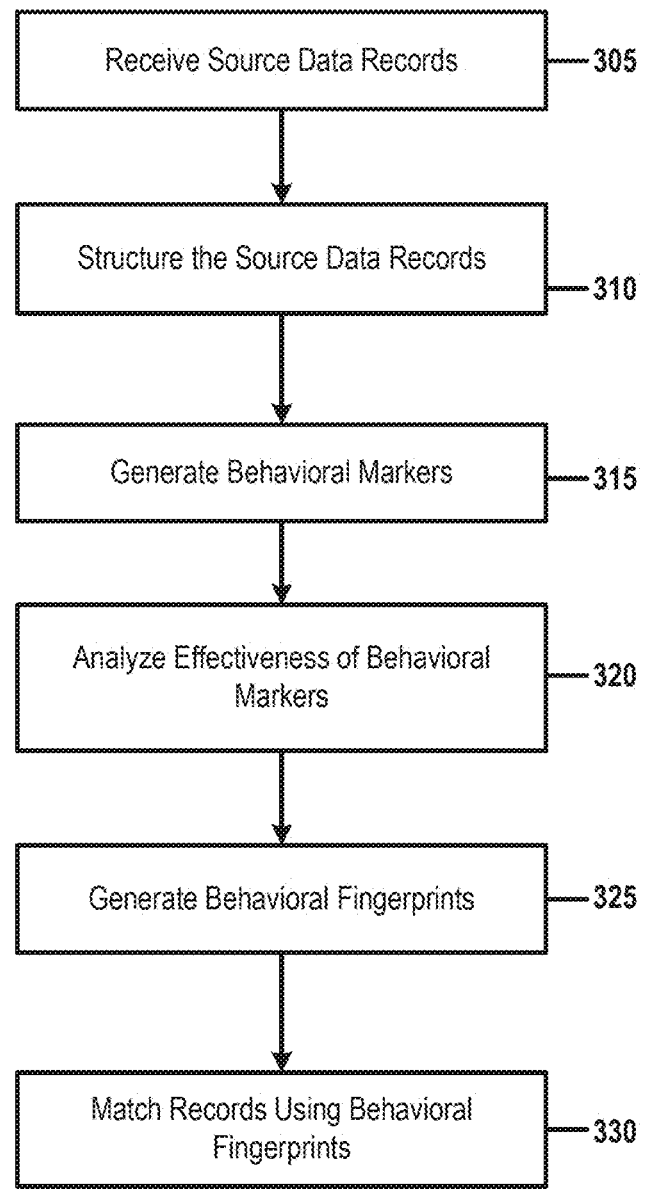
FIG. 3 depicts a flow diagram for an illustrative method of matching records using behavioral markers according to some embodiments.

FIG. 3 depicts a flow diagram for an illustrative method behavioral-based user records identification using anonymous user information according to some embodiments that may be performed by the matching system, such as through one or more server logic devices, arranged in accordance with at least some embodiments described herein. Example methods may include one or more operations, functions or actions as illustrated by one or more of blocks 305, 310, 315, 320, 325, and/or 330. The operations described in blocks 305-330 may also be stored as computer-executable instructions in a computer-readable medium such the memory elements 410, 415, and 425 depicted in FIG. 4. Although illustrated as discrete blocks, various blocks may be divided into additional blocks, combined into fewer blocks, or eliminated, depending on the desired implementation. The operations described in blocks 305-330 may be performed by a content developer, a content distributor, a content provider, a content presentation device, a network system, a broadcast network, or any combination thereof.

As shown in FIG. 3, the matching system may receive 305 source data records. For example, the matching system may have communication pathways with devices and/or source data record providers, such as service providers, marketers, or the like. The matching system may structure 310 the source data records. For instance, the matching application may position, correlate, arrange, or otherwise associate the source data records with a sequential timeline. The matching application may generate 315 behavioral markers for the source data records. In some embodiments, the behavioral markers may be developed using aggregation and/or classification of a same portion of each source data record.

The effectiveness of the behavioral markers may be analyzed 320 to determine, for example, how well each marker is able to identify unique records and/or the effectiveness of combinations of the behavioral markers. In some embodiments, the analysis of the behavioral markers may include a statistical analysis. The matching application may generate 325 one or more behavioral fingerprints based on at least one of the behavioral markers. In some embodiments, the behavioral fingerprints may include various combinations of behavioral markers and/or modifications to the behavioral markers. The behavioral fingerprints may be used to match 330 record, such as source data records. In some embodiments, the entity and/or system generating the behavioral fingerprints may be different from the entity and/or system matching the records.

Figure 4:
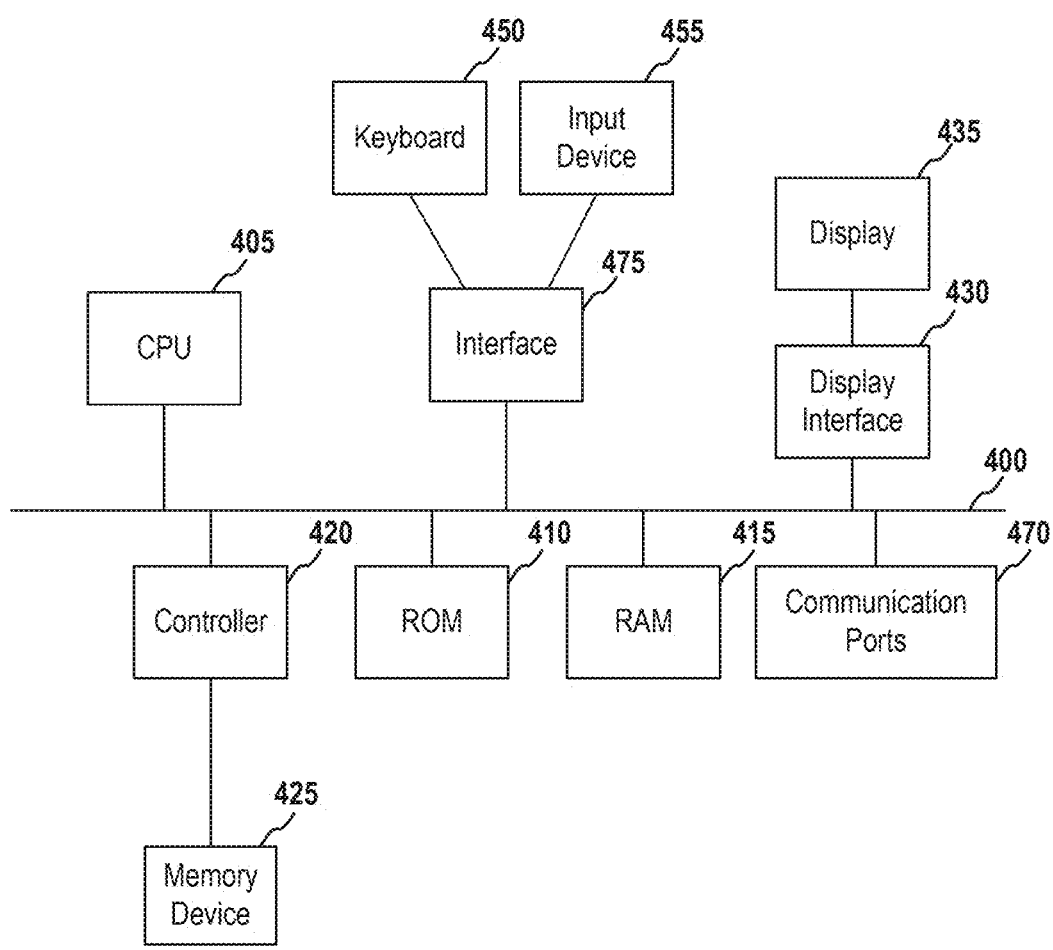
FIG. 4 illustrates various embodiments of a computing device for implementing the various methods and processes described herein.

FIG. 4 depicts a block diagram of exemplary internal hardware that may be used to contain or implement the various computer processes and systems as discussed above. A bus 400 serves as the main information highway interconnecting the other illustrated components of the hardware. CPU 405 is the central processing unit of the system, performing calculations and logic operations required to execute a program. CPU 405 is an exemplary processing device, computing device or processor as such terms are used within this disclosure. Read only memory (ROM) 430 and random access memory (RAM) 435 constitute exemplary memory devices.

A controller 420 interfaces with one or more optional memory devices 425 via the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with the determination, configuration, transmission, decoding, or the like of the presentation settings as described above may be stored in the ROM 430 and/or the RAM 435. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 430 can permit information from the bus 400 to be displayed on the display 435 in audio, visual, graphic or alphanumeric format. Communication with external devices may occur using various communication ports 440. An exemplary communication port 440 may be attached to a communications network, such as the Internet or a local area network.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

The invention claimed is:

1. A method comprising:
receiving, from one or more computing devices, data comprising anonymous information associated with user interactions with the one or more computing devices;
determining, based on the data, a timeline of the user interactions over a time duration;
generating, based on the timeline of the user interactions over the time duration, one or more behavioral markers;
generating, based at least in part on an aggregation of the one or more behavioral markers, one or more behavioral fingerprints comprising information unique to at least one computing device of the one or more computing devices; and
causing, based on the one or more behavioral fingerprints, output of identifying information of one or more users of the at least one computing device.

2. The method of claim 1, wherein the generating the one or more behavioral fingerprints is further based on at least one of:
a statistical analysis of the one or more behavioral markers, or
a modification of the one or more behavioral markers.

3. The method of claim 2, wherein the statistical analysis indicates an effectiveness of each behavioral marker of the one or more behavioral markers at identifying unique data.

4. The method of claim 3, wherein the effectiveness indicates a type of user interaction for which the one or more behavioral markers is effective at identifying the unique data.

5. The method of claim 3, wherein the effectiveness is associated with a combination of behavioral markers of the one or more behavioral markers.

6. The method of claim 1, wherein the user interactions include at least one of television viewing, downloading a file, Internet activity, social network activity, electronic program guide activity, personal video recorder activity, or purchasing activity.

7. The method of claim 1, wherein at least a portion of the data comprises unstructured data and the determining the timeline of the user interactions over the time duration further comprises:
matching at least a portion of the unstructured data with a time on the timeline.

8. A device comprising:
one or more processors; and
memory storing instructions that, when executed by the one or more processors, cause the device to:
receive, from one or more computing devices, data comprising anonymous information associated with user interactions with the one or more computing devices;
determine, based on the data, a timeline of the user interactions over a time duration;
generate, based on the timeline of the user interactions over the time duration, one or more behavioral markers;
generate, based at least in part on an aggregation of the one or more behavioral markers, one or more behavioral fingerprints comprising information unique to at least one computing device of the one or more computing devices; and
cause, based on the one or more behavioral fingerprints, output of identifying information of one or more users of the at least one computing device.

9. The device of claim 8, wherein the generating the one or more behavioral fingerprints is further based on at least one of:
a statistical analysis of the one or more behavioral markers, or
a modification of the one or more behavioral markers.

10. The device of claim 9, wherein the statistical analysis indicates an effectiveness of each behavioral marker of the one or more behavioral markers at identifying unique data.

11. The device of claim 10, wherein the effectiveness indicates a type of user interaction for which the one or more behavioral markers is effective at identifying the unique data.

12. The device of claim 10, wherein the effectiveness is associated with a combination of behavioral markers of the one or more behavioral markers.

13. The device of claim 8, wherein the user interactions include at least one of television viewing, downloading a file, Internet activity, social network activity, electronic program guide activity, personal video recorder activity, or purchasing activity.

14. The device of claim 8, wherein at least a portion of the data comprises unstructured data and the determining the timeline of the user interactions over the time duration further comprises:
matching at least a portion of the unstructured data with a time on the timeline.

15. A non-transitory computer-readable storage medium storing computer-readable instructions that, when executed by a processor, cause:
receiving, from one or more computing devices, data comprising anonymous information associated with user interactions with the one or more computing devices;
determining, based on the data, a timeline of the user interactions over a time duration;
generating, based on the timeline of the user interactions over the time duration, one or more behavioral markers;
generating, based at least in part on an aggregation of the one or more behavioral markers, one or more behavioral fingerprints comprising information unique to at least one computing device of the one or more computing devices; and
causing, based on the one or more behavioral fingerprints, output of identifying information of one or more users of the at least one computing device.

16. The non-transitory computer-readable storage medium of claim 15, wherein the generating the one or more behavioral fingerprints is further based on at least one of:
a statistical analysis of the one or more behavioral markers, or
a modification of the one or more behavioral markers.

17. The non-transitory computer-readable storage medium of claim 16, wherein the statistical analysis indicates an effectiveness of each behavioral marker of the one or more behavioral markers at identifying unique data.

18. The non-transitory computer-readable storage medium of claim 17, wherein the effectiveness indicates a type of user interaction for which the one or more behavioral markers is effective at identifying the unique data.

19. The non-transitory computer-readable storage medium of claim 17, wherein the effectiveness is associated with a combination of behavioral markers of the one or more behavioral markers.

20. The non-transitory computer-readable storage medium of claim 15, wherein the user interactions include at least one of television viewing, downloading a file, Internet activity, social network activity, electronic program guide activity, personal video recorder activity, or purchasing activity.

\* \* \* \* \*